United States Patent
Takase et al.

(10) Patent No.: US 10,836,328 B2
(45) Date of Patent: Nov. 17, 2020

(54) VEHICLE UPHOLSTERY MEMBER

(71) Applicant: HONDA MOTOR CO., LTD., Tokyo (JP)

(72) Inventors: Tsutomu Takase, Wako (JP); Yuki Takamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 113 days.

(21) Appl. No.: 16/240,122

(22) Filed: Jan. 4, 2019

(65) Prior Publication Data

US 2019/0232889 A1    Aug. 1, 2019

(30) Foreign Application Priority Data

Jan. 31, 2018    (JP) ................. 2018-014381

(51) Int. Cl.
*B60R 13/02*    (2006.01)
(52) U.S. Cl.
CPC ...... *B60R 13/0256* (2013.01); *B60R 13/0243* (2013.01); *B60R 13/0262* (2013.01); *B60R 2013/0281* (2013.01)
(58) Field of Classification Search
CPC ............ B60R 13/0256; B60R 13/0262; B60R 13/0243; B30R 2013/0281
See application file for complete search history.

(56) References Cited

U.S. PATENT DOCUMENTS

2008/0135167 A1\* 6/2008 Simmons .................. B32B 3/28
156/245
2010/0013260 A1 1/2010 Vasko et al.

FOREIGN PATENT DOCUMENTS

| JP | 2004196045 A | 7/2004 |
|---|---|---|
| JP | 2007050644 A | 3/2007 |
| JP | 2014008863 A | 1/2014 |
| JP | 2016013801 A | 1/2016 |

OTHER PUBLICATIONS

Machine translation of Notice of Reasons for Refusal for Japanese application No. 2018-014381, dated Jun. 25, 2019, 5 pages.

\* cited by examiner

*Primary Examiner* — D Glenn Dayoan
*Assistant Examiner* — Melissa Ann Bonifazi
(74) *Attorney, Agent, or Firm* — Armstrong Teasdale LLP

(57) ABSTRACT

A vehicle upholstery member includes a base member provided with a surface layer having a three-dimensional shape. An outer surface of the surface layer is formed of planar surface elements arranged without gaps therebetween, each planar surface element having a polygonal planar shape with a predetermined size.

11 Claims, 6 Drawing Sheets

VEHICLE UPHOLSTERY MEMBER

TECHNICAL FIELD

The present invention relates to a vehicle upholstery member that can be used in an instrumental panel, a door trim and the like.

BACKGROUND ART

A vehicle upholstery member used in the instrumental panel, door trim and the like may have various patterns and surface shapes to improve the aesthetic appearance. For instance, a vehicle upholstery member having a wood grain pattern on the surface thereof is known (see JP2007-50644A, for example). The upholstery member disclosed in JP2007-50644A includes a resin panel having a surface provided with irregularities for imitating a wood surface three-dimensionally, and a film covering the surface of the resin panel. The film has a wood grain pattern printed thereon, and is disposed on the surface of the resin panel such that the wood grain pattern corresponds to the irregularities of the resin panel.

However, due to the texture of the resin panel, it is difficult to reproduce the wood grain pattern completely with the resin panel, and as a result, the resin panel imitating the wood grain pattern is often inferior in appearance than the real wood. Further, when another natural shape such as water ripple, wind ripple marks, cloud form, crystal form, etc. is applied to the resin panel, it is difficult to reproduce these pattern and to satisfy users' demand. Thus, it is difficult to provide an upholstery member with an excellent aesthetic appearance by merely imitating a natural shape. Therefore, there is a need for a vehicle upholstery member having a novel aesthetic appearance that can satisfy users.

SUMMARY OF THE INVENTION

In view of the above background, a primary object of the present invention is to provide a vehicle upholstery member having a novel aesthetic appearance.

To achieve the above object, one embodiment of the present invention provides a vehicle upholstery member (4), comprising a base member (6) provided with a surface layer (20) having a three-dimensional shape (31, 32), wherein an outer surface of the surface layer is formed of planar surface elements (21) arranged without gaps, each planar surface element having a polygonal planar shape with a predetermined size.

According to this arrangement, because the three-dimensional shape of the surface layer of the vehicle upholstery member is formed of multiple planar surface elements, the vehicle upholstery member is provided with a novel aesthetic appearance that is angular or uneven. The multiple planar surface elements each exhibiting a polygonal shape form a geometric pattern on the surface having a three-dimensional shape. Further, because the three-dimensional shape of the surface is formed of multiple planar surface elements, fingers of a user do not come into close contact with the surface of the vehicle upholstery member easily, and the user receives a dry touch feel from the surface.

In the above arrangement, preferably, all sides (22) forming an arbitrary one of the planar surface elements each overlap one of sides forming adjoining other planar surface elements, and all vertices (23) forming an arbitrary one of the planar surface elements each overlap one of vertices forming the adjoining other planar surface elements.

According to this arrangement, the planar surface elements can be arranged without gaps.

In the above arrangement, preferably, a ridgeline (25) or a valley line (26) is formed at a boundary between adjoining ones of the planar surface elements.

According to this arrangement, each planar surface element becomes clear, and the aesthetic appearance is improved.

In the above arrangement, preferably, each planar surface element exhibits a regular polygonal shape. Also preferably, the all planar surface elements are formed to have a same shape and a same size.

According to these arrangements, the geometric pattern formed by the planar surface elements can be made conspicuous on the surface layer of the base member. As a result, the aesthetic appearance of the vehicle upholstery member is improved.

In the above arrangement, preferably, the three-dimensional shape (32) includes a shape imitating a natural shape including at least one of water ripple, wood grain, wind ripple marks, cloud form, and crystal form.

According to this arrangement, by approximating a natural shape using multiple planar surface elements, a novel aesthetic appearance can be formed.

In the above arrangement, preferably, the base member is made of resin.

According to this arrangement, the vehicle upholstery member can be manufactured easily.

In the above arrangement, preferably, the base member constitutes an instrumental panel (4).

According to this arrangement, it is possible to provide an instrumental panel with a novel aesthetic appearance.

According to the above arrangement, it is possible to provide a vehicle upholstery member having a novel aesthetic appearance.

DESCRIPTION OF THE PREFERRED EMBODIMENT(S)

In the following, an embodiment of a vehicle upholstery member according to the present invention will be described. The vehicle upholstery member is a member constituting an inner wall surface of a passenger compartment, and may include, for example, an instrumental panel, a door trim, a glove box lid, and a center console. In the following embodiment, description will be made of an example in which the present invention is applied to the instrumental panel.

Figure 1:
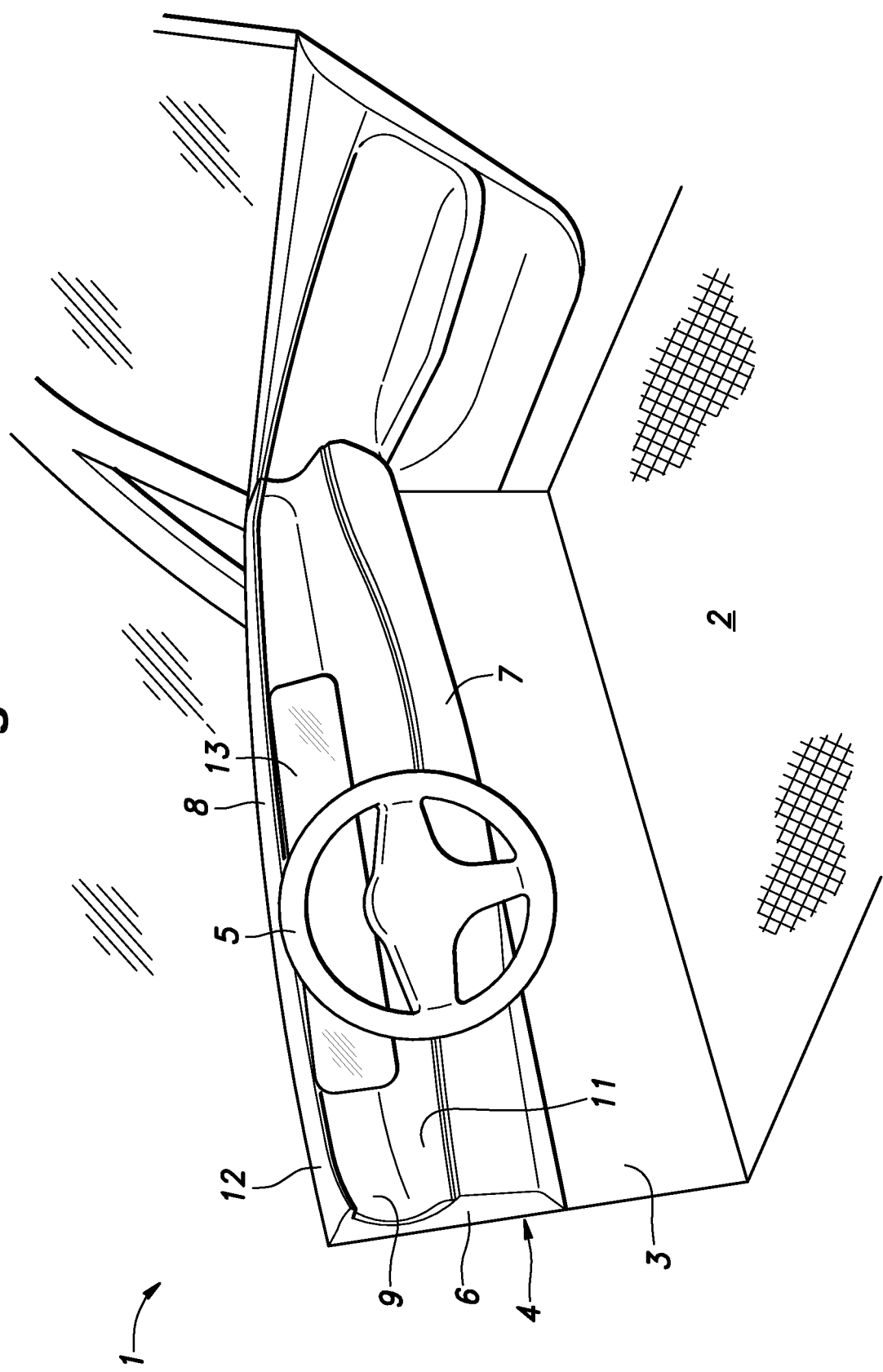
FIG. 1 is a perspective view showing a front part of a passenger compartment of a vehicle.

As shown in FIG. 1, a vehicle 1 consisting of a four-wheeled automobile has a passenger compartment 2 at a central part thereof in a fore and aft direction for accommodating passengers. The front part of the passenger compartment 2 is defined by a dashboard 3 extending laterally and having a surface facing in the fore and aft direction. The rear surface of the dashboard 3 is provided with an instrumental panel 4 for supporting meters and switches. A steering wheel 5 is provided to be located behind the instrumental panel 4. The steering wheel 5 is connected to a rear end of a steering shaft not shown in the drawings, and the steering shaft extends forward through the instrumental panel 4.

Figure 2:
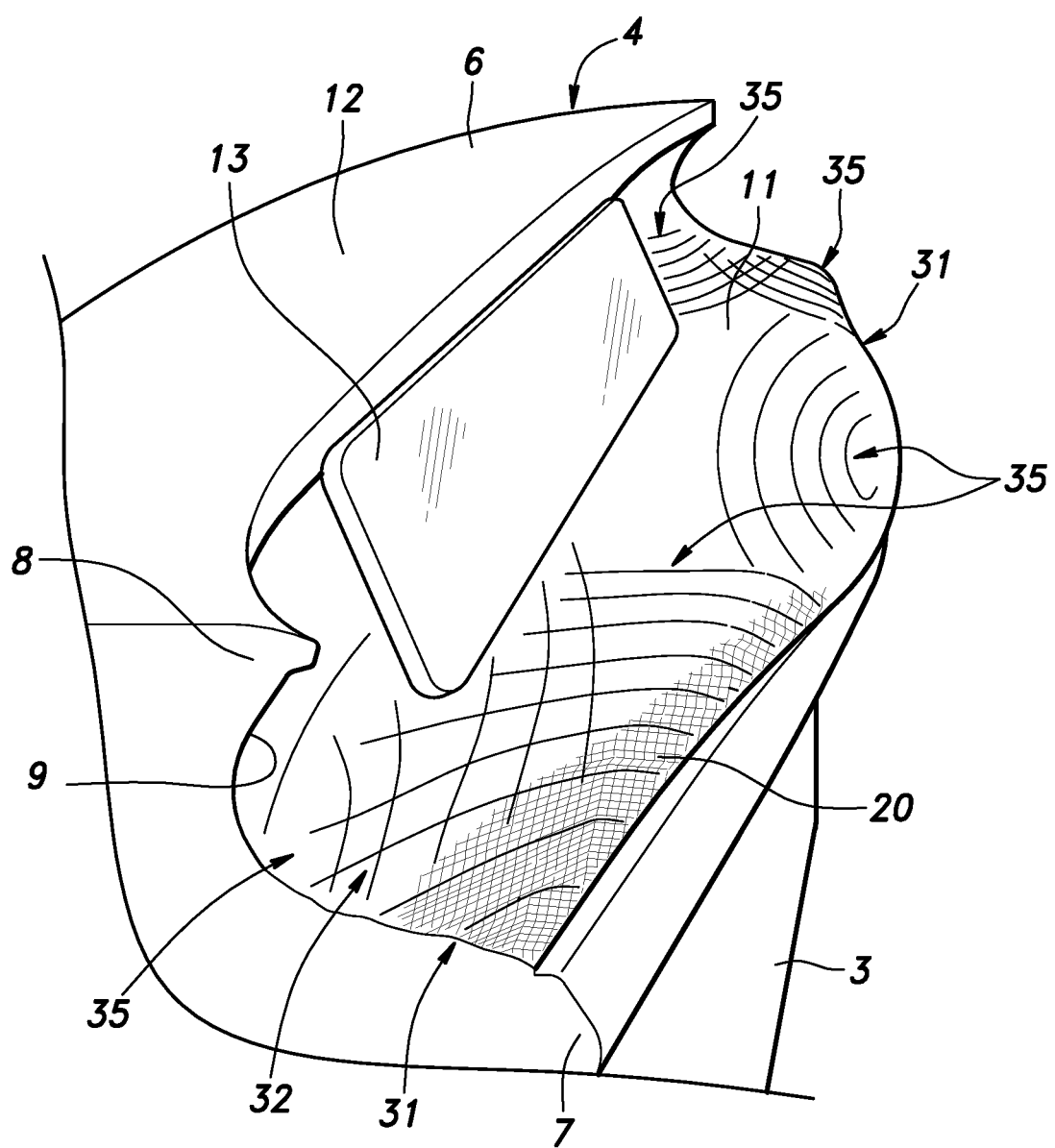
FIG. 2 is a perspective view of an instrumental panel with a steering wheel being removed.

The instrumental panel 4 has a base member 6 made of resin and attached to a rear surface of the dashboard 3. The base member 6 is formed by injection-molding resin such as olefinic resin or ABS resin, for example. As shown in FIGS. 1 and 2, the base member 6 has a first bulging portion 7 bulging rearward relative to the dashboard 3 and a second bulging portion 8 bulging rearward relative to the dashboard 3 at a position above the first bulging portion 7. Each of the first bulging portion 7 and the second bulging portion 8 extends laterally, and a recess 9 that is recessed forward and extends laterally is defined between the first bulging portion 7 and the second bulging portion 8. The first bulging portion 7 and the second bulging portion 8 have respective upper surfaces 11 and 12 at their upper parts such that the upper surfaces 11 and 12 face upward and extend substantially horizontally.

On the upper surface 11 of the first bulging portion 7 is disposed a plate-shaped display 13 to face rearward. The display 13 is formed in a laterally elongated rectangular shape, and has an upper edge extending along a projecting end of the second bulging portion 8. Namely, the display 13 is disposed behind the recess 9. The display 13 is configured to display vehicle state information such as the traveling speed and the remaining energy level, warnings for reminding use of the seat belt and for indicating failure information or the like, and a navigation screen for showing a map, guide information, etc. The display 13 preferably consists of a touch panel that allows the user to perform touch input.

The surface of the first bulging portion 7 and the surface of the second bulging portion 8 of the base member 6 are provided with a surface layer 20 having a three-dimensional shape. In the present embodiment, the surface layer 20 is made of the same material as the material of the base member 6 and formed integrally with the base member 6. In another embodiment, the surface layer 20 may be made of a material different from the material of the base member 6 and joined to the base member 6 by means of adhesive, engagement means, fastening means, etc.

Figure 3A:
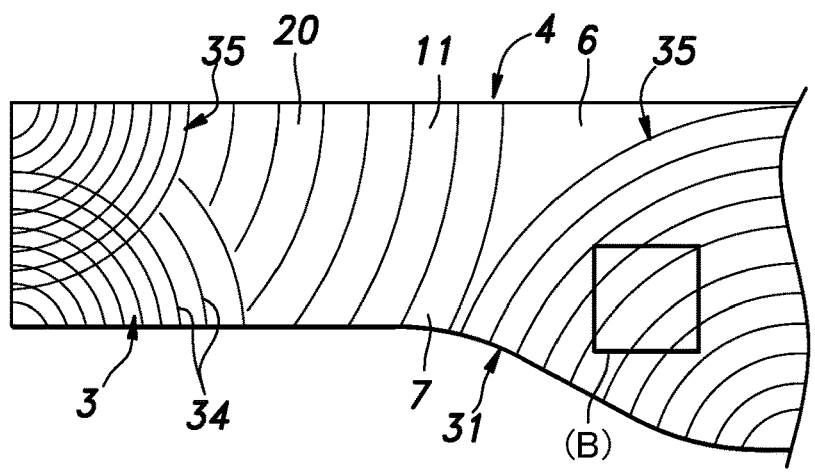
FIG. 3A is a plan view showing a left half of an upper part of a first bulging portion of the instrumental panel.
Figure 3B:
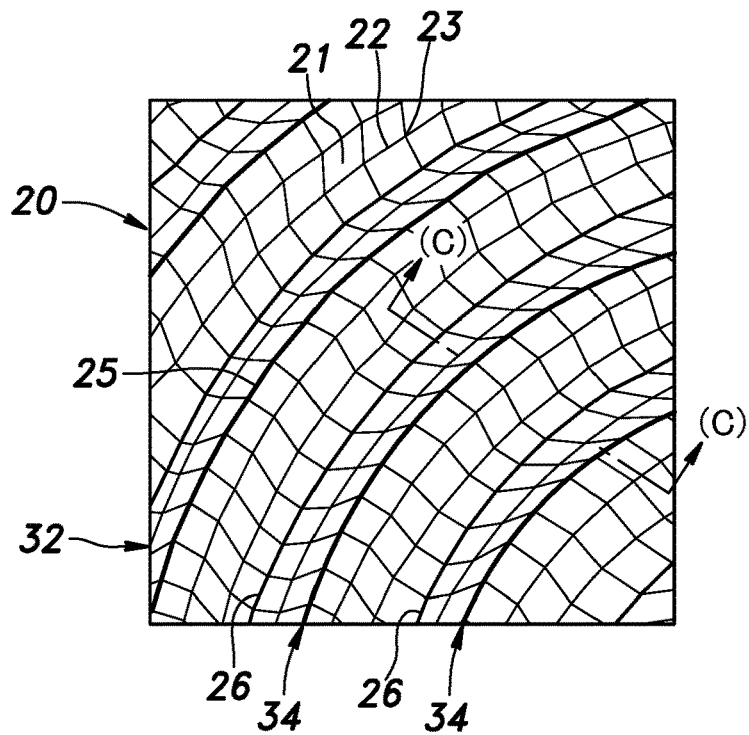
FIG. 3B is an enlarged view of a part (B) of FIG. 3A.
Figure 4:
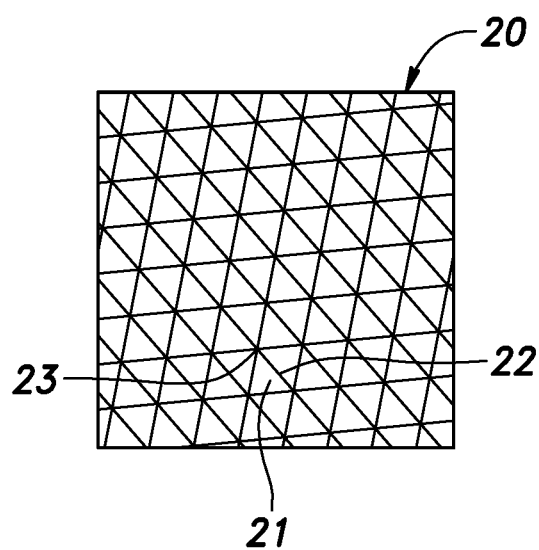
FIG. 4 is a plan view showing an example in which each planar surface element of a surface layer is triangular.
Figure 5:
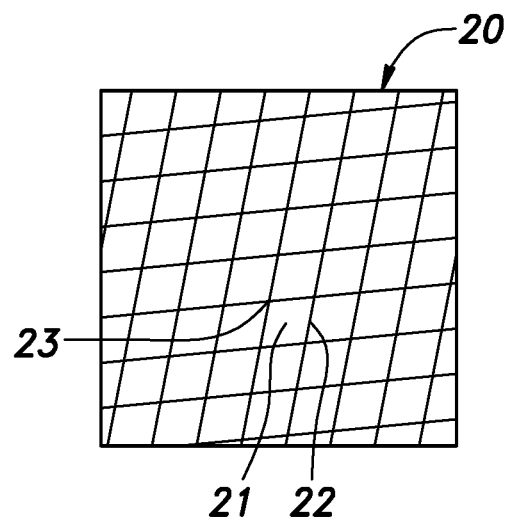
FIG. 5 is a plan view showing an example in which each planar surface element of a surface layer is quadrilateral.

As shown in FIGS. 2 and 3B, an outer surface of the surface layer 20 is formed by arranging planar surface elements 21 without gaps therebetween, wherein each planar surface element 21 has a polygonal planar shape with a predetermined size. The polygonal shape may be triangular, quadrilateral, pentagonal, or hexagonal, for example. Preferably, the polygonal shape is a regular polygonal shape such as a regular triangular shape, a regular quadrilateral shape (square), a regular pentagonal shape, or a regular hexagonal shape. The triangular shape may be right-angled or isosceles, for example. The quadrilateral shape may be rectangular, rhomboidal, or a rhombic, for example. FIG. 4 shows an example of the surface of the surface layer 20 in which the planar surface elements 21 have a regular triangular shape, and FIG. 5 shows an example of the surface of the surface layer 20 in which the planar surface elements 21 have a parallelogrammatic shape. In the illustrated example, the planar surface elements 21 are formed to have a rectangular shape.

As shown in FIGS. 3B and 4, all sides 22 forming an arbitrary one of the planar surface elements 21 each overlap one of the sides 22 forming adjoining other planar surface elements 21. In other words, any adjoining planar surface elements 21 share one side 22 with each other. Further, all vertices 23 forming an arbitrary one of the planar surface elements 21 each overlap one of the vertices 23 forming adjoining other planar surface elements 21.

Figure 3C:
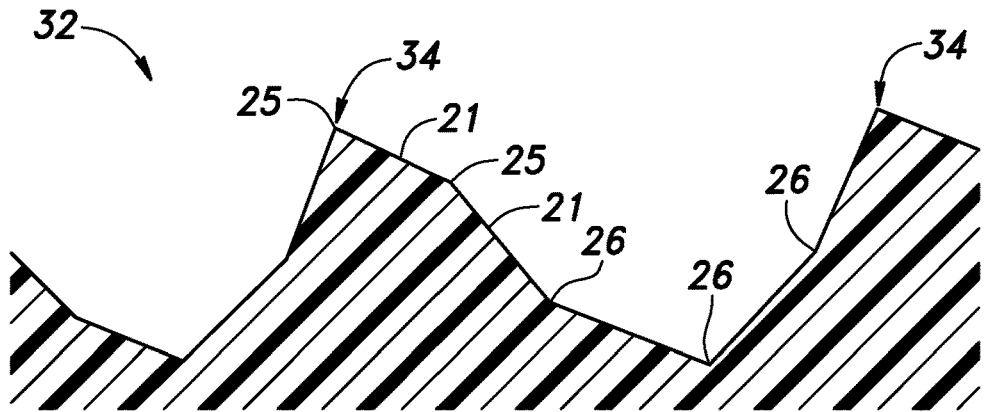
FIG. 3C is a cross-sectional view taken along line C-C in FIG. 3B.

A ridgeline 25 or a valley line 26 is formed at a boundary between adjoining ones of the planar surface elements 21. It is to be noted that a ridgeline 25 that is located higher than its adjacent ridgelines 25/valley lines 26 in a cross section as shown in FIG. 3C may be referred to as a peak ridge line 25, and a valley line 26 that is located lower than its adjacent ridgelines 25/valley lines 26 in a cross section as shown in FIG. 3C may be referred to as a bottom valley line 26.

The all sides 22 of the polygons constituting the planar surface elements 21 are in a range from 3 mm to 50 mm, for example, and preferably, in a range from 3 mm to 20 mm. Preferably, the all planar surface elements 21 are formed to have the same shape and the same size.

In the following, the surface layer 20 of the first bulging portion 7 will be described. The description on the surface layer 20 of the second bulging portion 8 is substantially the same as the description on the surface layer 20 of the first bulging portion 7, and hence, is omitted. As shown in FIG. 2, the surface layer 20 extends along an outline of the first bulging portion 7 and has a first three-dimensional shape 31 corresponding to the outline of the first bulging portion 7. The first three-dimensional shape 31 is formed of multiple planar surface elements 21. Thereby, the first three-dimensional shape 31 is formed to be an angular or uneven surface having multiple ridgelines 25 and valley lines 26.

Figure 6:
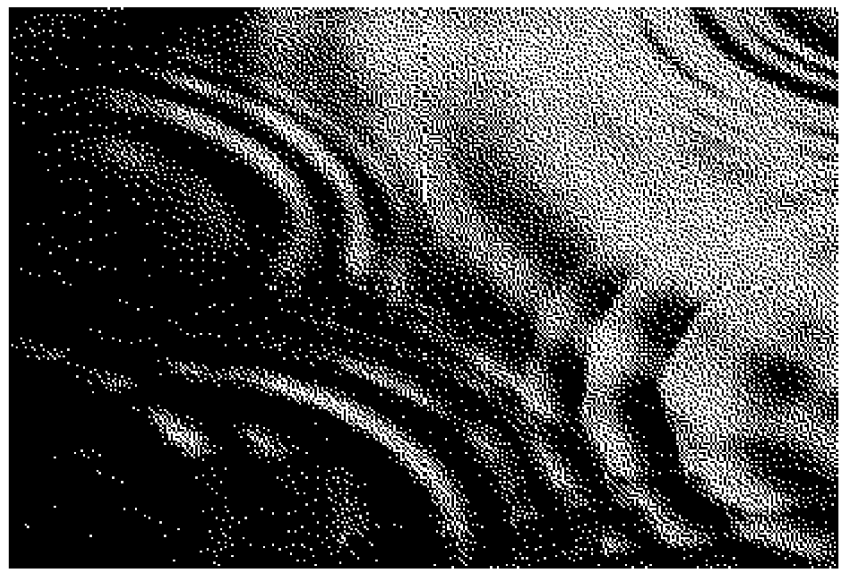
FIG. 6 is an image showing an example of water ripple as a natural shape.

As shown in FIGS. 2 and 3A, a second three-dimensional shape 32 is formed on the first three-dimensional shape 31 formed by the surface layer 20. The second three-dimensional shape 32 is formed to imitate a natural shape, which includes at least one of water ripple, wood grain, wind ripple marks, cloud form, and crystal form. FIG. 6 exemplarily shows a shape of water ripple included in the natural shape. In the illustrated embodiment the second three-dimensional shape 32 is formed to imitate the water ripple as exemplarily shown in FIG. 6.

As shown in FIGS. 3B and 3C, the second three-dimensional shape 32 includes at least one set 35 of concentric, arc-shaped elevations 34 protrudingly provided on the first three-dimensional shape 31. Each elevation 34 is defined between adjacent bottom valley lines 26 and includes a peak ridge line 25 therebetween, whereby the elevation 34 has a substantially triangular cross-section as shown in FIG. 3C. An outer surface of each elevation 34 is formed of multiple planar surface elements 21. Thereby, the second three-dimensional shape 32 is formed to be an angular or uneven surface having multiple ridgelines 25 and valley lines 26.

As shown in FIG. 2, in the illustrated embodiment, five sets 35 of concentric elevations 34 are formed, such that the five sets 35 have their centers at a left front corner, a left rear corner, a rear edge center, a right front corner, and a right rear corner of the upper surface 11 of the first bulging portion 7, respectively. Preferably, in each set 35, elevations 34 located more distant from the center of the set 35 have smaller heights.

The elevations 34 belonging different sets 35 may intersect each other.

In the arrangement described above, the first three-dimensional shape 31 and the second three-dimensional shape 32 forming the outer shape of the surface of the instrumental panel 4 are formed of multiple planar surface elements 21. The first three-dimensional shape 31 and the second three-dimensional shape 32 have a three-dimensional shape formed of so-called polygons. Thereby, the instrumental panel 4 has an angular or uneven aesthetic appearance.

The first three-dimensional shape 31 occupying a large part of the instrumental panel 4 is formed of multiple planar surface elements 21, and thus, the instrumental panel 4 can give users a novel impression with the uneven aesthetic appearance.

The second three-dimensional shape 32 has an effect of further ornamenting the first three-dimensional shape 31. The second three-dimensional shape 32 formed of multiple planar surface elements 21 has a shape approximating water ripple such that the water ripple is deformed to have angularities. As a result, users are less likely to recognize the second three-dimensional shape 32 in comparison with the shape of real water ripple, but tend to recognize the second three-dimensional shape 32 as a novel design. This makes users more likely to have a favorable impression on the second three-dimensional shape 32.

The planar surface elements 21 each exhibiting a polygonal shape form a geometric pattern on the surfaces of the first three-dimensional shape 31 and the second three-dimensional shape 32. When each of the planar surface elements 21 exhibits a regular polygonal shape in which all sides have the same length, the geometric pattern can be made even more conspicuous on the surfaces of the first three-dimensional shape 31 and the second three-dimensional shape 32. Particularly, by forming the surface of the second three-dimensional shape 32 for constituting a natural shape with the planar surface elements 21 each exhibiting a regular polygonal shape, the geometric pattern can be made conspicuous in the natural shape, and a novel aesthetic appearance different from the actual natural shape can be formed.

In addition, because the irregularities in the surface of the instrumental panel 4 are formed by multiple planar surface elements 21 such that multiple ridgelines 25 and valley lines 26 are constituted, when the user touches the instrumental panel 4, the fingers of the user do not come into close contact with the surface of the instrumental panel 4 easily. Thereby, the user can receive an uneven touch feel and a dry touch feel from the surface.

A concrete embodiment of the present invention has been described in the foregoing, but the present invention is not limited to the embodiment and may be modified or altered in various ways. It is only required that some area of the surface layer 20 be formed by multiple planar surface elements 21, and it is not necessary that the entire area of the surface layer 20 be formed by the planar surface elements 21. Also, a part of the surface layer 20 formed of a continuous planar member does not need to be formed by the planar surface elements 21.

The surface layer 20 may be formed of a thin sheet made of aluminum or the like and the planar surface elements 21 may be formed by bending the thin sheet. In such an arrangement, the ridgelines 25 and the valley lines 26 can be made clearer.

The surface layer 20 in the foregoing embodiment may be used as an upholstery member for the vehicle 1 other than the instrumental panel 4, such as a door trim, a glove box lid, a center console, etc.

The invention claimed is:

1. A vehicle upholstery member constituting an inner wall surface of a passenger compartment, comprising a base member provided with a surface layer having a three-dimensional shape,
    wherein an outer surface of the surface layer is exposed to the passenger compartment and formed of planar surface elements arranged without gaps, each planar surface element having a polygonal planar shape with a predetermined size,
    wherein the all planar surface elements are formed to have a same shape and a same size.

2. The vehicle upholstery member according to claim 1, wherein all sides forming an arbitrary one of the planar surface elements each overlap one of sides forming adjoining other planar surface elements, and
    all vertices forming an arbitrary one of the planar surface elements each overlap one of vertices forming the adjoining other planar surface elements.

3. The vehicle upholstery member according to claim 1, wherein a ridgeline or a valley line is formed at a boundary between adjoining ones of the planar surface elements.

4. The vehicle upholstery member according to claim 1, wherein each planar surface element exhibits a regular polygonal shape.

5. The vehicle upholstery member according to claim 1, wherein the three-dimensional shape includes a shape imitating a natural shape including at least one of water ripple, wood grain, wind ripple marks, cloud form, and crystal form.

6. The vehicle upholstery member according to claim 1, wherein the base member is made of resin.

7. The vehicle upholstery member according to claim 1, wherein the base member constitutes an instrumental panel.

8. The vehicle upholstery member according to claim 1, wherein the three-dimensional shape includes at least one set of concentric and arc-shaped elevations, and the outer surface of each elevation is formed of multiple planar surface elements.

9. The vehicle upholstery member according to claim 8, wherein in each set of concentric and arc-shaped elevations, elevations located more distant from the center of the set of concentric and arc-shaped elevations have smaller heights.

10. The vehicle upholstery member according to claim 1, wherein all sides of the polygonal planar shapes constituting the planar surface elements are in a range from 3 mm to 50 mm.

11. The vehicle upholstery member according to claim 1, wherein the polygonal shape is one of triangular, quadrilateral, pentagonal, and hexagonal.

* * * * *